US009214823B1

(12) United States Patent
Koller et al.

(10) Patent No.: US 9,214,823 B1
(45) Date of Patent: Dec. 15, 2015

(54) CORRELATING OPERATIONAL STATES AND BATTERY USAGE OF DEVICES TO EXTEND BATTERY DURATION

(75) Inventors: Gary D. Koller, Overland Park, KS (US); Mark D. Peden, Olathe, KS (US); Simon Youngs, Overland Park, KS (US); Raymond E. Reeves, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 414 days.

(21) Appl. No.: 13/331,727

(22) Filed: Dec. 20, 2011

(51) Int. Cl.
| *G06F 15/16* | (2006.01) |
| *G01R 31/36* | (2006.01) |
| *H02J 7/00* | (2006.01) |
| *H04B 1/38* | (2015.01) |
| *H04L 29/08* | (2006.01) |

(52) U.S. Cl.
CPC ......... *H02J 7/0047* (2013.01); *H02J 2007/005* (2013.01); *H04L 67/2823* (2013.01); *H04L 67/2828* (2013.01)

(58) Field of Classification Search
CPC ............. H04L 67/2823; H04L 67/2828; H03J 7/0047; H02J 2007/005; H02J 2007/0049
USPC ................... 709/224, 203, 208, 219; 713/340; 455/574, 573; 702/63; 320/132, 134
See application file for complete search history.

(56) References Cited

U.S. PATENT DOCUMENTS

| 4,743,831 | A | * | 5/1988 | Young ........................... 320/127 |
| 5,119,011 | A | * | 6/1992 | Lambert ....................... 320/136 |
| 6,067,171 | A | * | 5/2000 | Yamada et al. ............... 358/406 |
| 6,087,808 | A | * | 7/2000 | Pritchard ...................... 320/132 |
| 6,108,579 | A | * | 8/2000 | Snell et al. ...................... 607/29 |
| 6,317,697 | B1 | * | 11/2001 | Yoshikawa et al. ............ 702/63 |
| 6,362,601 | B1 | * | 3/2002 | Finger .......................... 320/153 |
| 6,449,726 | B1 | * | 9/2002 | Smith ........................... 713/340 |
| 6,456,043 | B1 | * | 9/2002 | Finger .......................... 320/134 |
| 6,624,635 | B1 | * | 9/2003 | Lui ............................... 324/426 |
| 6,842,708 | B2 | * | 1/2005 | Odaohhara ..................... 702/63 |
| 6,969,970 | B2 | * | 11/2005 | Dias et al. ..................... 320/106 |
| 7,504,801 | B2 | * | 3/2009 | Comery ........................ 320/107 |
| 7,570,018 | B2 | * | 8/2009 | Waguespack ................. 320/113 |
| 7,849,344 | B2 | * | 12/2010 | Karstens ....................... 713/340 |
| 7,996,514 | B2 | * | 8/2011 | Baumert et al. .............. 709/224 |

(Continued)

OTHER PUBLICATIONS

Wen et al., "History-based, Online, Battery Lifetime Prediction for Embedded and Mobile Devices," In Proceedings of PACS (2003) pp. 1-10.

(Continued)

*Primary Examiner* — Viet Vu
*Assistant Examiner* — Michael A Chambers (57) ABSTRACT

A plurality of client devices may each run on battery power and each experience respective battery usage while in a respective operational state. A server may receive, from the plurality of client devices, a plurality of reports correlating the client devices' respective operational states with the client devices' respective battery usage. Based on the reports, the server may identify at least two client devices in the plurality that reported a common operational state. The server may further determine a representative battery usage for the common operational state, and use this representative battery usage to predict battery usage for a particular client device that is in the common operational state. Then, the server may instruct the particular client device to take an action based upon the predicted battery usage.

18 Claims, 7 Drawing Sheets

(56) References Cited

U.S. PATENT DOCUMENTS

| | | | |
|---|---|---|---|
| 8,347,386 B2* | 1/2013 | Mahaffey et al. | 726/23 |
| 8,489,348 B2* | 7/2013 | Shirriff et al. | 702/63 |
| 8,533,844 B2* | 9/2013 | Mahaffey et al. | 726/25 |
| 8,751,010 B2* | 6/2014 | Rondoni et al. | 607/61 |
| 8,829,910 B2* | 9/2014 | Nishidai et al. | 324/427 |
| 2006/0290326 A1* | 12/2006 | Bhesania et al. | 323/210 |
| 2007/0021099 A1* | 1/2007 | Sato | 455/404.1 |
| 2008/0311961 A1* | 12/2008 | Cotevino et al. | 455/574 |
| 2009/0034990 A1* | 2/2009 | Nakazato et al. | 399/9 |
| 2009/0276015 A1* | 11/2009 | Rondoni et al. | 607/61 |
| 2011/0047594 A1* | 2/2011 | Mahaffey et al. | 726/1 |
| 2011/0047597 A1* | 2/2011 | Mahaffey et al. | 726/3 |
| 2011/0047620 A1* | 2/2011 | Mahaffey et al. | 726/23 |
| 2011/0077031 A1* | 3/2011 | Kim et al. | 455/458 |
| 2011/0128007 A1* | 6/2011 | Nishidai et al. | 324/427 |
| 2011/0301890 A1* | 12/2011 | Shirriff et al. | 702/63 |
| 2013/0113435 A1* | 5/2013 | Boschker | 320/134 |

OTHER PUBLICATIONS

Ravi et al., "Context-aware Battery Management for Mobile Phones: A Feasibility Study," IEEE PerCom 2008, pp. 224-233.

* cited by examiner

CORRELATING OPERATIONAL STATES AND BATTERY USAGE OF DEVICES TO EXTEND BATTERY DURATION

BACKGROUND

Battery-operated client devices, such as cell phones, tablet computers, and e-book readers, have become general-purpose computing platforms. As a result, these client devices allow users to download and operate various applications developed by third parties. Often, there is no entity verifying that these third parties use efficient programming techniques. Consequently, some third-party applications will have a disproportionate and deleterious impact on the battery duration of client devices.

OVERVIEW

In the past, some classes of battery-operated client devices offered few, if any, third-party applications. Thus, the battery duration of these devices was relatively predictable. Today, this is not the case. Application stores and markets host hundreds of thousands of downloadable applications for cell phones, tablet computers, e-book readers, and other types of devices. Based on the resources consumed by these applications, the efficiency with which the applications were programmed, and patterns of application use, each application may exhibit a battery usage profile. However, when a new application is released, this battery usage profile may not be apparent.

For example, if a user installs a new game on her cell phone, the game might drain the cell phone's battery level from 70% to 10% in less than an hour of operation. This behavior can be problematic, as the user might need to make a critical phone call, but the cell phone may not have sufficient battery duration to support the full length of the call. Such situations are especially problematic when the user does not have access to the appropriate adapters and/or power outlets to recharge the cell phone.

Further, some settings on certain client devices might also use a disproportionate amount of battery power. For instance, bright screen displays and use of certain network interfaces can rapidly drain battery capacity. Thus, it can be advantageous for a user to be aware of applications and settings on his or her client device that are causing, or may cause, excessive battery usage.

Sometimes, users find out about battery-draining applications and settings through word of mouth, perhaps from friends, co-workers, or via the Internet. However, this information is anecdotal at best, and may not be reliable. As more and more client devices and applications reach the market, the robustness of word-of-mouth distribution of this information is likely to decrease even further.

Example embodiments herein describe a systematic way of determining how specific applications and settings, on particular client devices, impact battery usage. At least some of these embodiments employ "crowd-sourcing," in which information is gathered from a potentially large number of client devices. This information may include measurements, or samples, of the respective operational states of these client devices, and their respective battery levels. These operational states, which may include the applications operating on the client device and the settings of the client device, are then correlated with the battery level measurements to determine which operational states have a significant impact on battery duration.

Based on this information, the client device may terminate one or more applications or change one or more settings on the client device in order to reduce battery usage. Alternatively or additionally, the client device may inform the user of applications and/or settings that may be responsible for disproportionately high battery usage so that the user can decide whether to terminate the applications and/or change the settings. By gathering this information across a number of client devices and/or over a period of time, a more reliable estimation of the impact that applications and settings have on battery life may be determined.

Accordingly, in an example embodiment, a plurality of client devices in a network communication system may each run on battery power and each experience respective battery usage while in a respective operational state. A server may receive, from the plurality of client devices, a plurality of reports correlating the client devices' respective operational states with the client devices' respective battery usage. Based on the received reports, the server may identify at least two client devices in the plurality that reported a common operational state. The server may statistically determine a representative battery usage for the common operational state based on the reported battery usage for the common operational state of the at least two client devices. The server may also use the representative battery usage for the common operational state as a basis to predict battery usage for a particular client device that is in the common operational state, and may instruct the particular client device to take an action based upon the predicted battery usage.

In another example embodiment, a battery manager may be operating on a client device. The battery manager may make a plurality of measurements of respective battery levels of the client device. Each of the measurements may be associated with respective data that includes a respective set of one or more applications operating on the client device and respective settings of the client device. The battery manager may transmit a report of the plurality of measurements and associated data to a server. Perhaps in response to transmitting the report, the battery manager may receive a message from the server. The message may instruct the battery manager to take an action to reduce battery usage by the client device. Possibly in response to receiving the message, the battery manager may initiate the action to reduce battery usage by the client device.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Example Network Architecture

Figure 1:
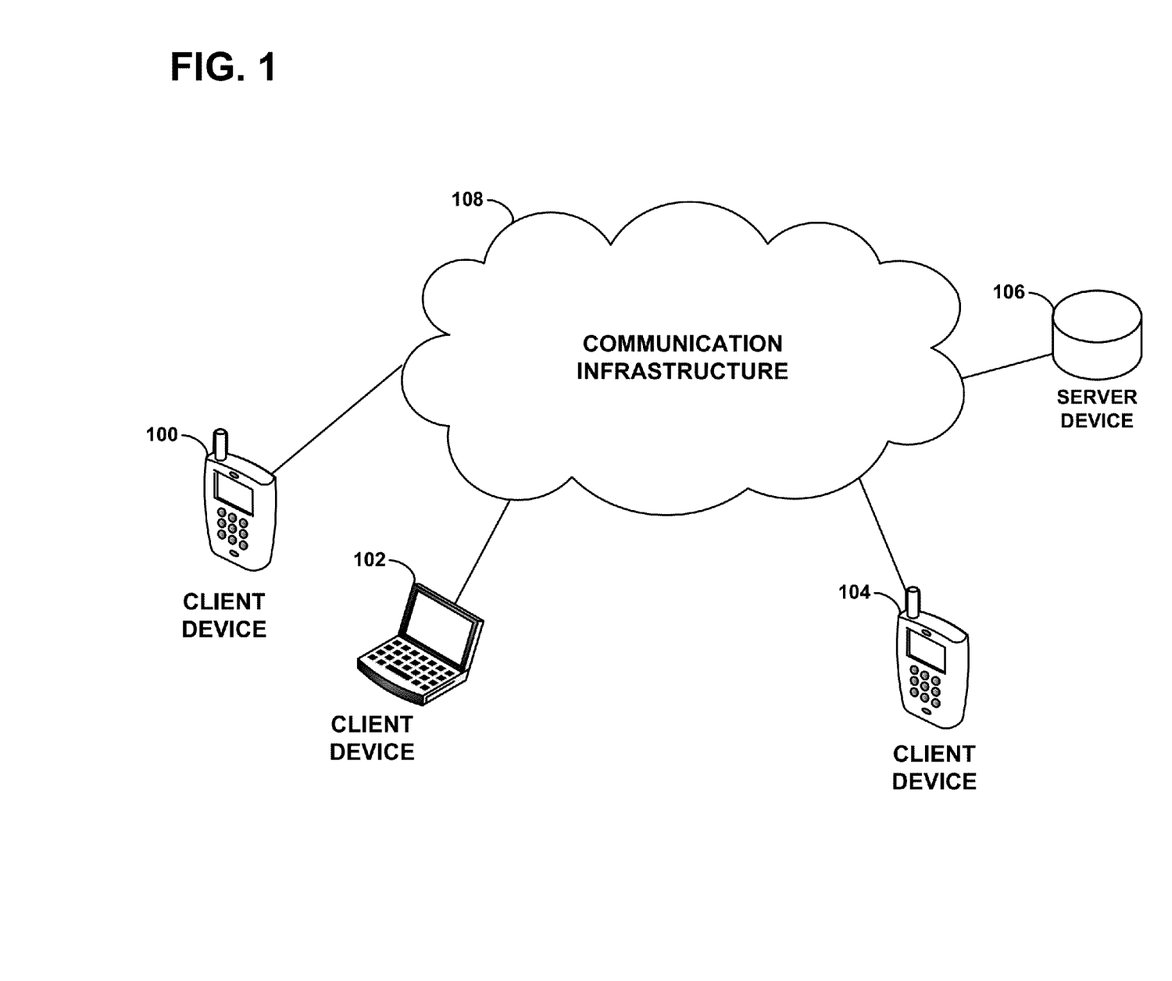
FIG. 1 depicts client devices capable of communicating with a server device, in accordance with an example embodiment.

FIG. 1 is a simplified block diagram of an example communication system, including client devices 100, 102, and 104, and server device 106. The three client devices may be battery-operated communication devices. However, the client devices may also be capable of operating while being plugged in to a power source, or otherwise being charged.

Each of these devices may be capable of communicating, using wireline or wireless technologies, over communication infrastructure 108. Thus, communication infrastructure 108 may facilitate this communication by providing signaling and/or bearer traffic paths between any of client devices 100, 102, and 104, as well as server device 106. Additionally, some or all of these devices may be capable of communication, via communication infrastructure 108 or another network or networks, with other devices.

Thus, client devices 100, 102, and 104 could be cell phones, tablet computers, e-book readers, laptop computers, personal digital assistants, or another type of wired or wireless device. In some embodiments, these client devices may be subscriber devices that are manipulated by a human in order to establish voice, video, and/or multimedia sessions with one another and with other devices. However, these devices could also be automated devices without a human interface.

Communication infrastructure 108 may be one or more networks that support access from wireline devices, wireless devices, or both. Thus, communication infrastructure 108 may include one or more connections to the public Internet and/or private IP networks, or may itself be distributed across various physical or topological locations on the public Internet and/or private IP networks.

As such, communication infrastructure 108 may contain various types of routers, switches, gateways, firewalls, and servers. These elements, as well as client devices 100, 102, and 104, may be coupled by wireline communication link technologies such as Ethernet, Token Ring, Synchronous Optical Networking (SONET), Asynchronous Transfer Mode (ATM), digital subscriber line (DSL), broadband cable television, or one or more of the various T-carrier systems. However, these elements may also, or alternatively, be coupled by wireless technologies, such as 802.11 (Wifi), BLUETOOTH®, Code Division Multiple Access (CDMA), Global System for Mobile communications (GSM), the 3rd Generation Partnership Program (3GPP) Long Term Evolution (LTE®), IDEN®, or Worldwide Interoperability for Microwave Access (WIMAX®).

Communication infrastructure 108 may also contain devices that enable traditional circuit-switched voice telephony, voice over Internet Protocol (VoIP), push to talk (PTT), multimedia calling and conferencing, audio or video streaming, gaming, or other audio, video, or multimedia applications. In order to facilitate a range of services, communication infrastructure 108 may comprise multiple physical and/or logical components associated with telephony services. For example, communication infrastructure 108 may include one or more base stations radiating to define wireless coverage areas, base station controllers, mobile switching centers, access gateways, authentication servers, and so on. To support multimedia services, communication infrastructure 108 may also include one or more of a call session control function, a signaling gateway, a media gateway control function, a media gateway, a home subscriber server, as well as various application servers and/or downloadable application logic.

Server device 106 may be a standalone or integrated device, and may be communicatively coupled to communication infrastructure 108, as shown in FIG. 1. Alternatively, server device 106 may be part of communication infrastructure 108. Server device 106 may be a personal computer, a standalone server, a blade server, a database, or another type of device. Server device 106 may take the form of a single physical device, or may be divided into multiple logical components spanning a number of physical devices.

The description of the elements in FIG. 1 is merely introductory and should not be interpreted to limit the characteristics and functions of these devices. Accordingly, it should be understood that this and other arrangements and processes described herein are set forth for purposes of example only. Thus, other arrangements and elements (e.g., machines, interfaces, functions, orders of elements, etc.) can be added or used instead and some elements may be omitted altogether. Further, as in most communication architectures, those skilled in the art will appreciate that many of the elements described herein are functional entities that may be implemented as discrete components or in conjunction with other components, in any suitable combination or location.

II. Example Computing Device

Figure 2:
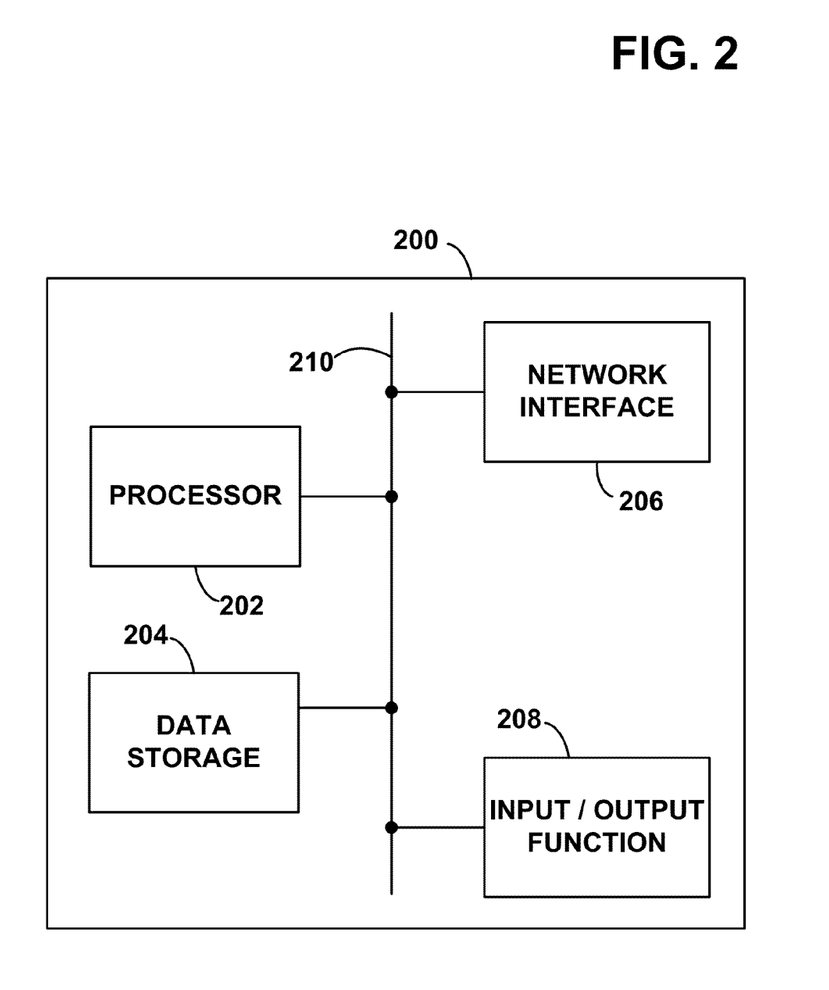
FIG. 2 is a high-level diagram of a computing device, in accordance with an example embodiment.

FIG. 2 is a simplified block diagram exemplifying a computing device 200. This computing device illustrates some of the functional elements that may be found in a client device and/or a server device arranged to operate in accordance with the embodiments herein. Thus, computing device 200 may represent the hardware and/or software architecture of any one or more of client devices 100, 102, and 104, as well as server device 106.

Computing device 200 may include a processor 202, data storage 204, network interface 206, and input/output function 208, all of which may be coupled by a system bus 210 or a similar mechanism. Processor 202 may include one or more central processing units (CPUs), such as one or more general purpose processors and/or one or more dedicated processors (e.g., application specific integrated circuits (ASICs) or digital signal processors (DSPs), etc.)

Data storage 204, in turn, may comprise volatile and/or non-volatile data storage and can be integrated in whole or in part with processor 202. Data storage 204 may store program instructions, executable by processor 202, and data that are manipulated by these instructions to carry out the various methods, processes, or functions described herein. Alternatively, these methods, processes, or functions can be defined by hardware, firmware, and/or any combination of hardware, firmware and software. Therefore, data storage 204 may be a tangible, non-transitory computer-readable medium, having stored thereon program instructions that, upon execution by one or more processors, cause computing device 200 to carry out any of the methods, processes, or functions disclosed in this specification or the accompanying drawings.

Network interface 206 may take the form of a wireline connection, such as an Ethernet, Token Ring, or T-carrier connection. Network interface 206 may also take the form of a wireless connection, such as Wifi, BLUETOOTH®, or a wide-area wireless connection. However, other forms of physical layer connections and other types of standard or proprietary communication protocols may be used over network interface 206. Furthermore, network interface 206 may comprise multiple physical communication interfaces.

Input/output function 208 may facilitate user interaction with example computing device 200. Input/output function 208 may comprise multiple types of input devices, such as a keyboard, a mouse, a touch screen, a microphone, and/or any other device that is capable of receiving input from a user. Similarly, input/output function 208 may comprise multiple types of output devices, such as a display, printer, one or more light emitting diodes (LEDs), speaker, or any other device that is capable of providing output discernible to a user. Additionally or alternatively, example computing device 200 may support remote access from another device, via network interface 206 or via another interface (not shown), such an RS-232 or Universal Serial Bus (USB) port.

III. Example Measurements and Reports

As noted above, any of client devices 100, 102, and/or 104 may be battery-operated devices, such as a cell phone, tablet computer, laptop computer, or e-book reader. Many of these types of devices may incorporate a general-purpose operating system, which may allow users to download and execute various third-party applications. While some of these applications may have a minimal impact on client devices, others may make extensive use of the processing and/or communication capabilities of the client devices. As a result, some applications may result in excessive and disproportionate battery usage.

One class of applications that tend to drain battery power rapidly is games. Many games employ sophisticated graphics that require extensive processing resources. Further, while these games are being played, the screen of the client device is usually on, which may result in additional battery drain.

However, if may be difficult for a user of a client device to determine which applications cause the client device's battery to drain. For example, a user may install dozens of applications on a cell phone. While some of these applications may operate only when explicitly invoked, others may operate continuously "in the background" and/or periodically. For example, an email application may be idle for a period of time, become active to check and download new emails from the user's email accounts, then become idle again.

The user might not even be aware which applications operate periodically or in the background, as these applications might not provide the user with any indication that they are operating in such a manner. Consequently, the client device's battery may drain rapidly without the user necessarily knowing the cause. The user might instead believe that the client device itself is either poorly-designed or defective.

Moreover, some applications may unintentionally put a strain on client devices' batteries. An application may be inefficiently programmed, or have defects (bugs) that cause the application to use more processing and/or network resources than anticipated. For example the application might have a defect that, from time to time, causes the application to enter an endless loop in its program logic. From the user's perspective, the client device might seem to randomly lose some or all of its battery life.

In addition to applications, the settings of a client device can have an impact on battery usage. Many modern client devices include several network interfaces. For example, a cell phone might have Wifi, BLUETOOTH®, near field communication (NFC), $3^{rd}$ generation wide-area wireless (3G), and/or $4^{th}$ generation wide-area wireless (4G) interfaces. Some of these interfaces, when activated, may periodically attempt to communicate with a network. If network coverage is poor, the client device may use a significant amount of battery power when doing so.

Also, the screen brightness of the client device can negatively impact battery duration. In general, the brighter the screen of a battery-powered client device, the more the client device will use its battery power. Thus, turning down the brightness of the client device's screen, and/or blanking out the screen after a period of non-use, may increase the device's battery life.

Figure 3:
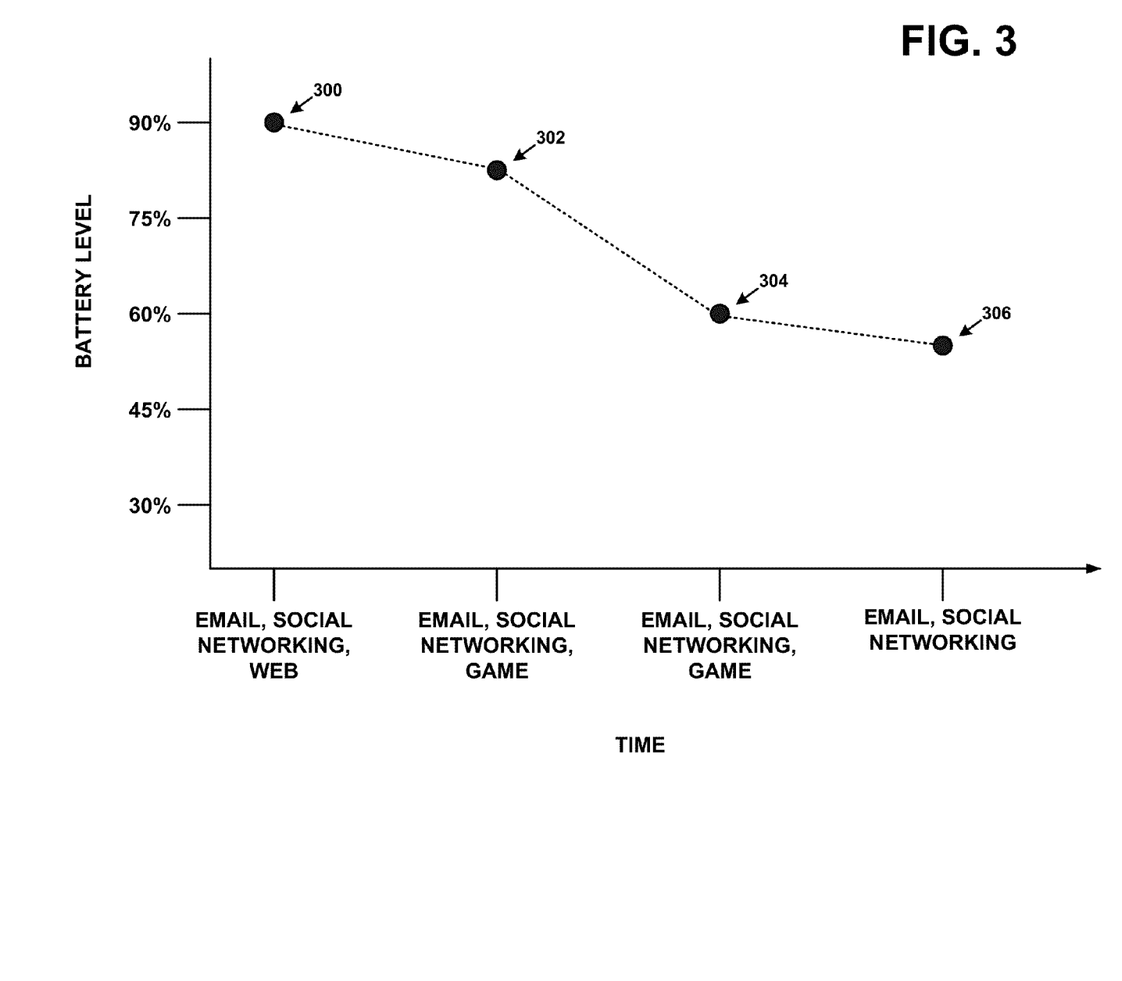
FIG. 3 depicts battery usage measurements of a client device, in accordance with an example embodiment.

FIG. 3 is a chart that illustrates the disproportionate impact that some applications may have on battery usage. On the y-axis of the chart, the battery level of a hypothetical client device is plotted. The x-axis of the chart represents time. At several points in time (points 300, 302, 304, and 306), the applications operating on the client device, and the battery level of the client device, are sampled. Thus, for instance, at point 300 an email application, a social networking application, and a web application are operating, at point 302 the email application, the social networking application, and a game application are operating, at point 304 the email application, the social networking application, and the game application are operating, and at point 306 the email application and the social networking application are operating.

For sake of example, it is assumed that points 300, 302, 304, and 306 are equidistant in time. Thus, for instance, there may be an hour of time elapsed between each of these points. However, the applications operating on a client device can be sampled more or less frequently. For example, the sampling may occur once every few seconds or once every few minutes. Further, while the samples in FIG. 3 are taken periodically, samples could instead be taken aperiodically, such as in response to a triggering event.

At point 300, the client device has a battery level of 90%. Over time, as long as the client device is not charged, this battery level will decrease based on the client device's operational state. Thus, at point 302, the battery level has decreased to about 82%. However, between point 302 and point 304, the battery level decreased from about 82% to 60%. At point 306, the battery level has decreased from 60% to 55%.

It may be possible to compare the applications operating on the client device at these points to the respective different battery decreases for each point to estimate the impact of applications on battery usage. For example, just the email and social networking applications are operating at point 306, and the battery level decreased only 5% between points 304 and 306. From this information, it appears that the email and social networking applications have a relatively minor impact on battery life. However, at points 302 and 304 the email, social networking and game applications are operating, and the battery level decreased by over 20%.

From this information, it can be inferred that the game application has a disproportionate impact on battery usage, in comparison to the email, social networking, and web applications. Namely, in the period when the game application was operating (from point 302 to point 304), a large decrease in battery level was observed. However, the game application was not operating the full time of the other two periods (from point 300 to point 302 and from point 304 to point 306), and the battery level decreased far less during these periods.

It should be noted that in the example illustrated in FIG. 3, it is possible that between points 302 and 304 the game application was terminated and the battery drain during this point was due to the operation of some other application. Therefore, conclusions drawn about the game application's impact on battery usage based on these samples are estimates. In practice, however, the applications operating on a client device may be sampled more frequently than once every 10 minutes to reduce the likelihood and impact of sampling bias. Further, gathering this information across a large number of client devices (as discussed below) and analyzing this information in aggregate will also reduce the likelihood and impact of sampling bias.

Similarly to how the chart in FIG. 3 shows samples of applications operating on a client device, the settings of a client device can also be sampled. As described above, the settings may include the states of various network interfaces and screen brightness. The settings may also include any other option that is configurable by the client device or its applications, such as the frequency that an email application checks for new messages, ringtone volume, when the client device displays audible, visual, or motion-based notifications or alarms, whether voice calls are made using the public switched telephone network or VoIP, and so on. Further, the applications operating on a client device and the settings of the client device may be sampled at about the same time, or at different times, by the same mechanism, or by different mechanisms.

Figure 4:
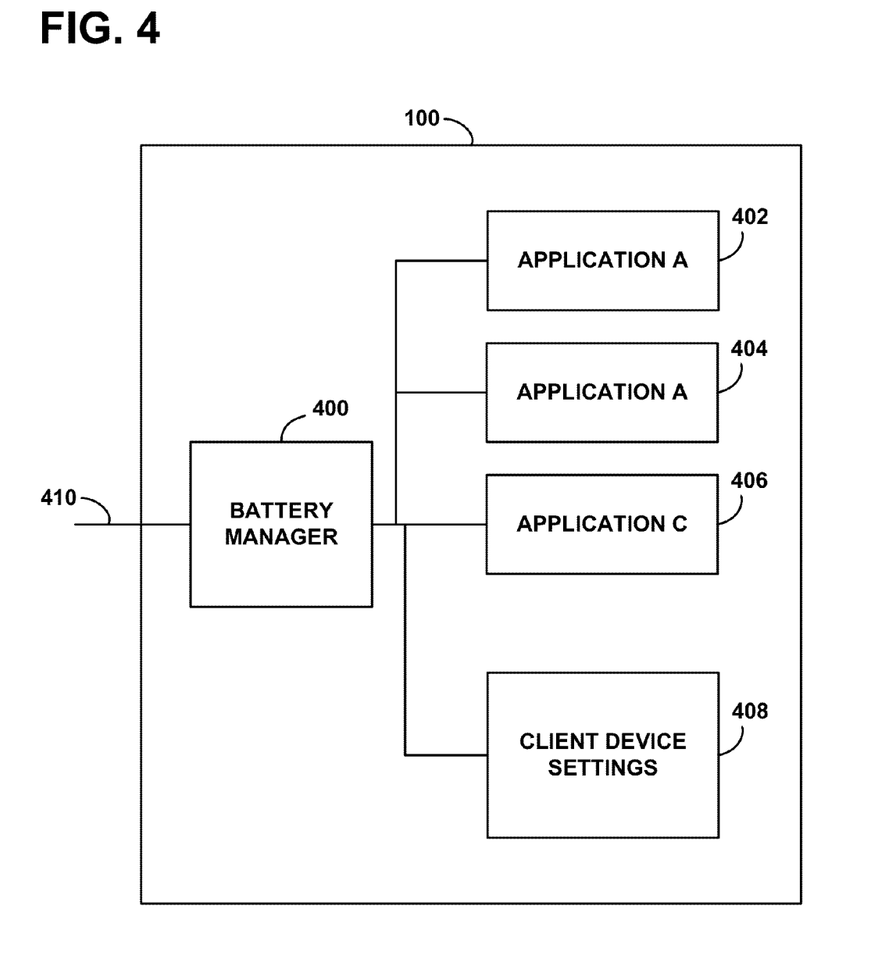
FIG. 4 depicts applications operating on a client device, in accordance with an example embodiment.

FIG. 4 depicts a software arrangement, for an example client device, that facilitates the gathering and reporting of respective operational states and battery levels of the client device. In FIG. 4, example client device 100 contains a battery manager 400, application A 402, application B 404, application C 406, and client device settings 408. Additionally, as shown in FIG. 4, battery manager 400 may be able to internally communicate with any of application A 402, application B 404, application C 406, or client device settings 408, and externally communicate via interface 410 with other devices.

Battery manager 400 may measure battery levels of client device 100, and may gather information about the applications operating on client device 100. Thus, for instance, battery manager 400 may query the operating system of client device 100 to determine that application A 402, application B 404, and application C 406 are operating on client device 100. Alternatively or additionally, these applications may indicate to battery manager 400 when they are operating. Battery manager 400 may also read client device settings 408 from time to time. Thus, for example, the samples shown in FIG. 3 may be gathered by battery manager 400. Once battery manager 400 has gathered this information, it may format, store, and/or report this information to another device.

Battery manager 400 may be a standalone application that is built into or downloadable to client device 100. Alternatively, battery manager 400 may be a component of the operating system of client device 100. Also, battery manager 400 may have access to one or more application programming interfaces, or other mechanisms, through which it can determine the battery level of client device 100.

While using data from, e.g., battery manager 400 to analyze samples of the operational states of a single client device may be useful, gathering such samples from a number of client devices (perhaps a large number of client devices) may facilitate a more accurate analysis. With a large sample size, broader trends of correlations between operational states and battery usage across various makes and models of client devices may be able to be determined.

Further, the data in these samples can be examined to determine when two or more client devices share a common operational state (e.g., when these client devices are running the same applications and/or have at least some of same settings configured). Based on the reported battery usage for the common operational state, a representative battery usage for the common operational state may be statistically determined. For instance, suppose that a number of devices all report a battery level decrease similar to that illustrated in FIG. 3 when operating the same email, social networking, and game applications. Then, a conclusion can be drawn, with some degree of statistical confidence, that other devices operating the same combination of applications will experience the same or a similar battery level decrease.

Once this analysis has been performed, individual client devices can be instructed to take specific steps that may reduce battery utilization. For instance, a client device might be instructed to terminate and/or uninstall a gaming application, turn off a wireless interface, or to lower its screen brightness. Alternatively, the client device might be instructed to notify the user of the client device of which applications and/or settings are deemed to be having the most negative impact on battery duration. Then the user can decide whether to terminate and/or uninstall the applications or change the settings.

In some embodiments, each of the various applications operating on a client device might be assigned a priority. This priority may reflect how important the application is to the operation of the client device and/or to the client device's user. Thus, for example, a game might be given a relatively low priority (e.g., below a priority threshold), while a phone application or a web browser might be given a relatively high priority (e.g., above the priority threshold).

The priority of an application may be taken into account when providing instructions to the client device, and/or when the client device determines how to process the instruction. For example, a cell phone's phone application could be assigned the highest possible priority. Thus, even if this application is consuming a disproportionate amount of battery power, the client device may refrain from terminating the application. On the other hand, a game application operating on the same cell phone might be given the lowest priority, and could be subject to termination even if it is using less battery power than the phone application.

Moreover, the analysis can be conducted separately for devices of specific makes and models. Thus, to the extent that the same operational states produce different patterns of battery usage on different types of client devices, these differences can be determined, device-specific instructions can be given, and device-specific recommendations can be made.

In order to facilitate the analysis of a potentially large amount of data from numerous client devices, the client devices may report samples of their respective operational states and battery levels to a server, such as server device 106. This server may be centrally-located or distributed across two or more locations.

Figure 5:
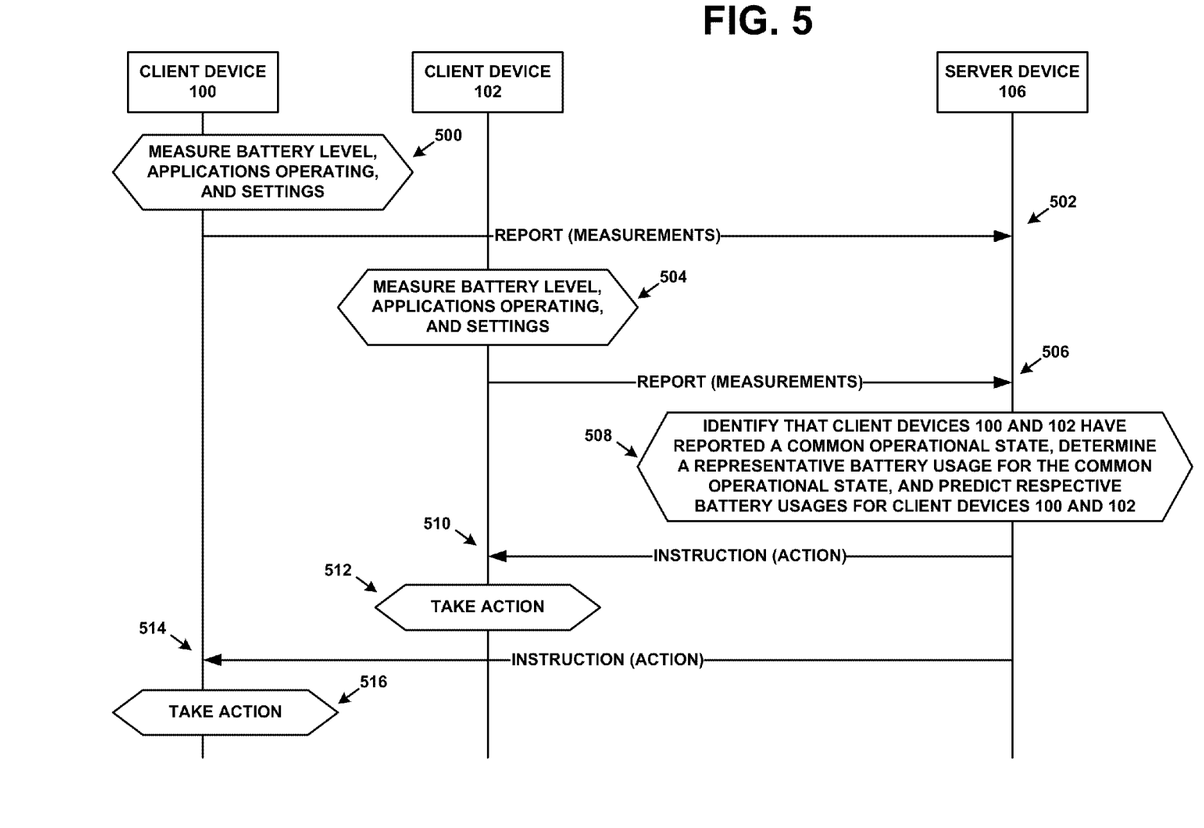
FIG. 5 is a message flow, in accordance with an example embodiment.

FIG. 5 is a message flow depicting example communication between two client devices and server device 106. At step 500, client device 100 may measure (perhaps via battery manager 400) its battery level, operating applications, and/or settings. At step 502, client device 100 may report these measurements to server device 106. Similarly, at step 504, client device 102 may measure its battery level, operating applications, and/or settings, and at step 506 may report these measurements to server device 106.

At step 508, server device 106 may identify that client device 100 and 102 have reported a common operational state (e.g., the client devices had the same set, or a similar set, of operating applications or settings configured). From these reports, server device 106 may determine a representative battery usage for the common operational state. Server device may 106 may also predict respective battery usages for client devices 100 and 102.

At step 510, server device 106 may transmit an instruction to client device 102. The instruction might instruct client device 102 to take a particular action based on its predicted battery usage. Then, at step 512, client device 102 may take this action. Similarly, at step 514, server device 106 may transmit an instruction to client device 100. This instruction might instruct client device 100 to take a particular action based on the predicted battery usage of client device 100, and at step 516 client device 100 may take this action.

For instance, if the action is to terminate an application, the client device may do so. Alternatively or additionally, if the action is to warn the user that the application has a disproportionate impact on battery power, the client device may do so. The instruction might also provide the client device an estimate of the client device's expected battery duration based on the client device's current operational state, and the client device might provide this information to the user. For example, if server device 106 estimates that client device 100 has only 10 minutes of battery duration remaining in its current operational state, server device might notify client device 100 of this estimate. Then, client device 100 may provide a visual, auditory, motion-based, or another type of indication to the user, warning him or her of this estimate. The user would then know that they might not be able to make a long phone call without making at least some changes to the applications and/or settings of client device 100.

Although the message flow of FIG. 5 involves only two client devices, the embodiment depicted in FIG. 5, other embodiments similar thereto, may involve hundreds, thousands, or millions of client devices. Further, these embodiments may include other messages and/or processing that does not appear in FIG. 5.

For situations in which the devices and/or systems discussed here collect information about users (e.g., the applications and settings used by such users), the users may be provided with an opportunity to opt in or out of programs or features that may collect such information. In addition, certain data may be anonymized before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user. As a result, any information collected or stored, for example, by server device 106, may be arranged not to reveal the identity, preferences, or usage patterns of any particular user.

IV. Example Methods

Figure 6:
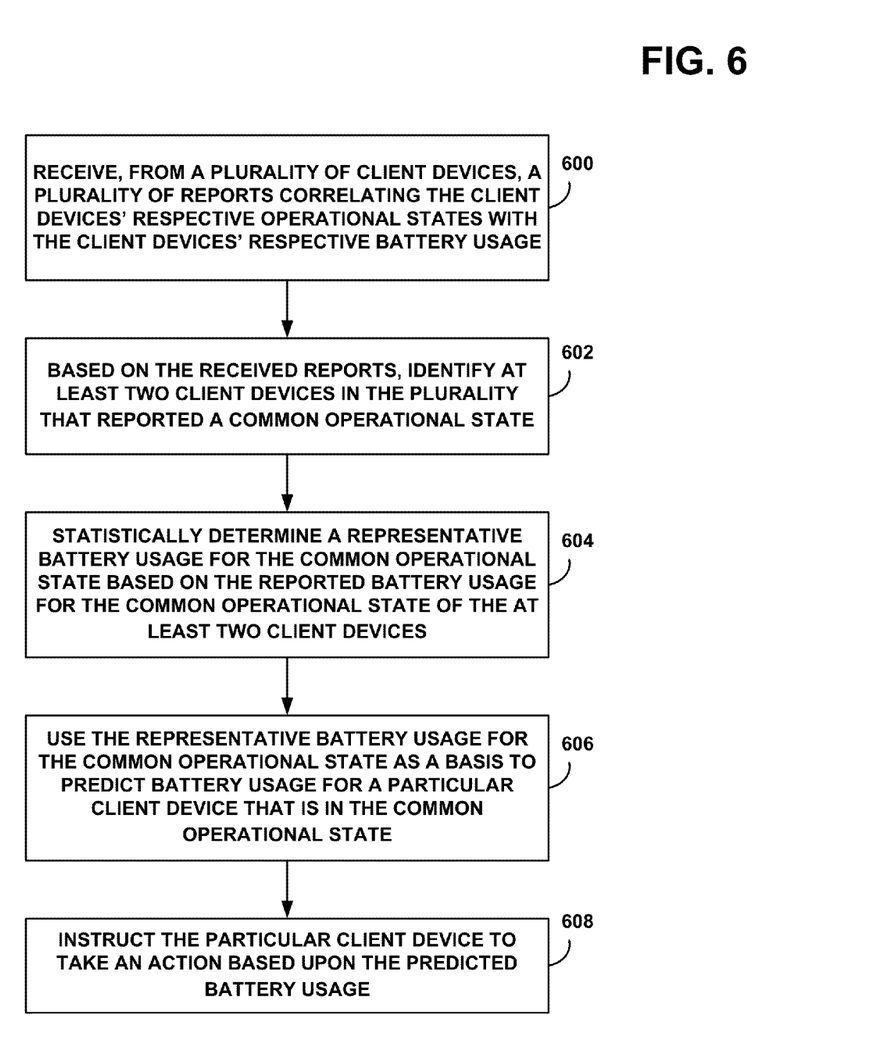
FIG. 6 is a flow chart, in accordance with an example embodiment.

FIG. 6 is a flow chart of an example method. One or more of the steps of FIG. 6 may be performed by a server device, such as server device 106. At step 600, a plurality of reports may be received from a plurality of client devices. The client devices may each run on battery power and may each experience respective battery usage while in a respective operational state. The reports may correlate the client devices' respective operational states with the client devices' respective battery usage. The respective operational states may include respective sets of one or more applications operating on the respective client devices.

At step 602, based on the received reports, at least two client devices in the plurality that reported a common operational state may be identified. At step 604, a representative battery usage for the common operational state may be statistically determined based on the reported battery usage for the common operational state of the at least two client devices. At step 606, the representative battery usage for the common operational state may be used as a basis to predict battery usage for a particular client device that is in the common operational state.

At step 608, the particular client device may be instructed to take an action based upon the predicted battery usage. This step may involve predicting a remaining battery duration of the particular client device based on at least the predicted battery usage of the particular client device and a current battery level of the particular client device, and instructing the particular client device to take the action based on the predicted remaining battery duration. Additionally, predicting the remaining battery duration of the particular client device may include predicting the remaining battery duration of the given device based on at least (i) the predicted battery usage of the particular client device, (ii) the current battery level of the particular client device, and (iii) an idle-state battery usage of the particular client device.

Moreover, instructing the particular client device to take the action based upon the predicted battery usage may involve instructing the particular client device to display an indication of at least one application operating on the client device that is associated with disproportionate battery usage. Alternatively or additionally, and as noted above, each respective application operating on the particular client device may be associated with a respective priority. Instructing the particular client device to take the action based upon the predicted battery usage may involve instructing the particular client device to display an indication of at least one application of the operating applications that is associated with a priority that is below a given priority threshold.

In other embodiments, instructing the particular client device to take the action based upon the predicted battery usage may encompass instructing the particular client device to terminate operation of at least one application operating on the client device that is associated with disproportionate battery usage. Alternatively or additionally, each respective application operating on the particular client device may be associated with a respective priority. Instructing the particular client device to take the action based upon the predicted battery usage may involve instructing the particular client device to terminate operation of at least one application of the operating applications, where the at least one application is associated with a priority that is below a given priority threshold.

Instructing the particular client device to take the action based upon the predicted battery usage may also encompass instructing the particular client device to change at least one setting of the particular client device. These setting(s) may be associated with, or otherwise determined to have likely caused, disproportionate battery usage.

Figure 7:
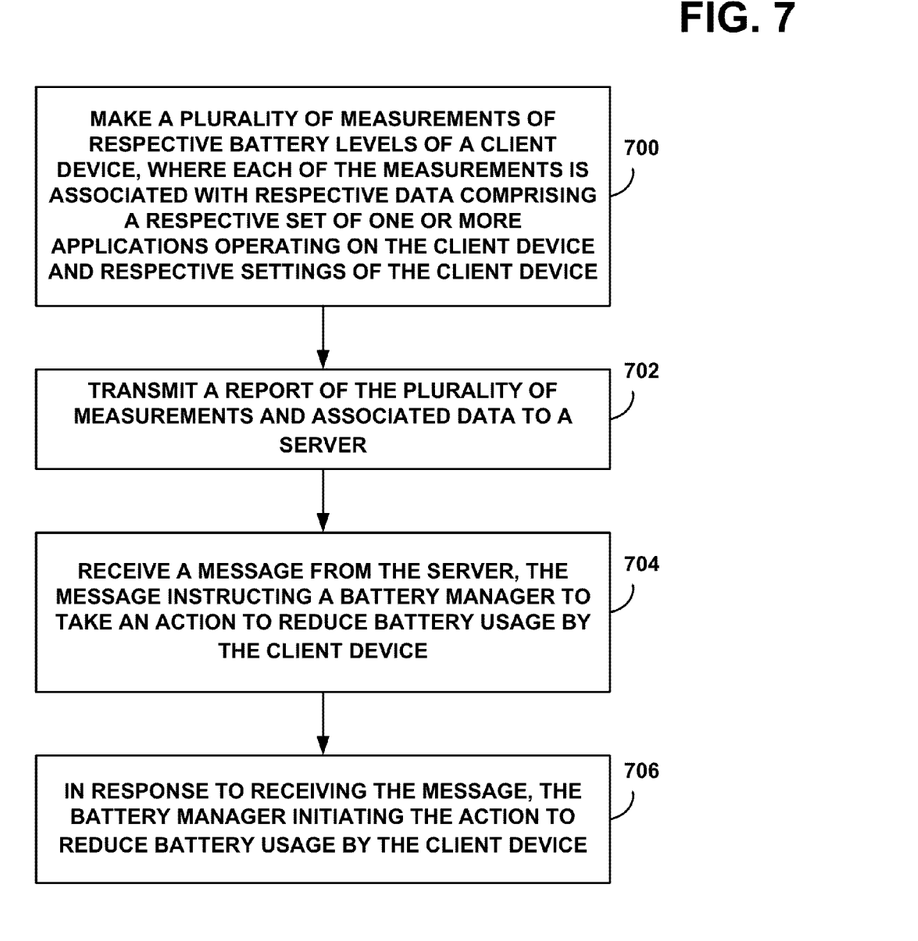
FIG. 7 is another flow chart, in accordance with an example embodiment.

FIG. 7 is a flow chart of another example method. Particularly, a client device may be operating a battery manager. At step 700, the battery manager may make a plurality of measurements of respective battery levels of the client device. Each of the measurements may be associated with respective data that includes a respective set of one or more applications operating on the client device and respective settings of the client device. At step 702, the battery manager may transmit a report of the plurality of measurements and associated data to a server. At step 704, the battery manager may receive a message, from the server, that instructs the battery manager to take an action to reduce battery usage by the client device. At step 706, possibly in response to receiving the message, the battery manager may initiate the action to reduce battery usage by the client device.

Initiating the action to reduce battery usage by the client device may involve terminating operation of an application that is associated with disproportionate battery usage. Alternatively or additionally, initiating the action to reduce battery usage by the client device may involve instructing the client device to display an indication of at least one application operating on the client device that is associated with disproportionate battery usage.

It should be understood that FIGS. 6 and 7 depict non-limiting embodiments. Thus, more or fewer steps than shown in FIGS. 6 and 7 may be used without departing from the scope of the embodiments. Additionally, each of these steps may be repeated one or more times, or may be omitted altogether, and these steps may occur in a different order than shown in FIGS. 6 and 7. Further, the flow charts of these figures may be combined with one another, in whole or in part. For instance, any of the additional features discussed in the context of FIG. 6 may also be applied to FIG. 7.

A step or block in any figure herein representing a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of tangible, non-transitory computer-readable medium such as a storage device including a disk or hard drive or other storage media.

V. Conclusion

Example embodiments have been described above. Those skilled in the art will understand, however, that changes and modifications may be made to these embodiments without departing from the true scope and spirit of the invention, which is defined by the claims.

The invention claimed is:

1. In a network communication system in which a plurality of client devices each run on battery power and each experience respective battery usage over time while in respective operational states, a method comprising:
   receiving into a server, from the plurality of client devices, a plurality of reports correlating the client devices' respective operational states with the client devices' respective battery usage over time, wherein the respective operational states comprise respective sets of a plurality of applications operating on the respective client devices;
   based on the received reports, the server identifying at least two client devices in the plurality that reported a common operational state;
   the server statistically determining a representative battery usage over time for the common operational state based on the reported battery usage over time for the common operational state of the at least two client devices;
   the server using the representative battery usage over time for the common operational state as a basis to predict a battery usage over time for a particular client device that is in the common operational state; and
   the server instructing the particular client device to take an action against at least one application operating on the particular client device based upon the predicted battery usage over time, wherein the action comprises one of displaying an indication of the at least one application operating on the particular client device or terminating operation of the at least one application operating on the particular client device.

2. The method of claim 1, wherein instructing the particular client device to take the action based upon the predicted battery usage over time comprises:
   predicting a remaining battery duration of the particular client device based on at least the predicted battery usage over time of the particular client device and a current battery level of the particular client device; and
   instructing the particular client device to take the action based on the predicted remaining battery duration.

3. The method of claim 2, wherein predicting the remaining battery duration of the particular client device based on at least the predicted battery usage over time of the particular client device and the current battery level of the particular client device comprises:
   predicting the remaining battery duration of the given device based on at least (i) the predicted battery usage over time of the particular client device, (ii) the current battery level of the particular client device, and (iii) an idle-state battery usage over time of the particular client device.

4. The method of claim 1, wherein instructing the particular client device to take the action based upon the predicted battery usage over time comprises instructing the particular client device to display the indication of the at least one application operating on the particular client device, and wherein the at least one application is associated with a disproportionate battery usage over time.

5. The method of claim 1, wherein each respective application operating on the particular client device is associated with a respective priority, wherein instructing the particular client device to take the action based upon the predicted battery usage over time comprises instructing the particular client device to display the indication of the at least one application operating on the particular client device, and wherein the at least one application is associated with a priority that is below a given priority threshold.

6. The method of claim 1, wherein instructing the particular client device to take the action based upon the predicted battery usage over time comprises instructing the particular client device to terminate operation of the at least one application operating on the particular client device, and wherein the at least one application is associated with a disproportionate battery usage over time.

7. The method of claim 1, wherein each respective application operating on the particular client device is associated with a respective priority, wherein instructing the particular client device to take the action based upon the predicted battery usage over time comprises instructing the particular client device to terminate operation of the at least one application operating on the particular client device, and wherein the at least one application is associated with a priority that is below a given priority threshold.

8. The method of claim 1, further comprising instructing the particular client device to change at least one setting of the particular client device, wherein the at least one setting is associated with a disproportionate battery usage over time.

9. A server device comprising:
   a processor;
   data storage; and
   program instructions, stored in the data storage, that, upon execution by the processor, cause the server device to (i) receive, from the plurality of client devices, a plurality of reports correlating the client devices' respective operational states with the client devices' respective battery usage over time, wherein the respective operational states comprise respective sets of a plurality of applications operating on the respective client devices, (ii) based on the received reports, identify at least two client devices in the plurality that reported a common operational state, (iii) statistically determine a representative battery usage over time for the common operational state based on the reported battery usage over time for the common operational state of the at least two client devices, (iv) use the representative battery usage over time for the common operational state as a basis to predict a battery usage over time for a particular client device that is in the common operational state, and (v) instruct the particular client device to take an action against at least one application operating on the particular client device based upon the predicted battery usage over time, wherein the action comprises one of displaying an indication of the at least one application operating on the particular client device or terminating operating of the at least one application operation on the particular client device.

10. The server device of claim 9, wherein instructing the particular client device to take the action based upon the predicted battery usage over time comprises (i) predicting a remaining battery duration of the particular client device based on at least the predicted battery usage over time of the particular client device and a current battery level of the particular client device, and (ii) instructing the particular client device to take the action based on the predicted remaining battery duration.

11. The server device of claim 10, wherein predicting the remaining battery duration of the particular client device based on at least the predicted battery usage over time of the particular client device and the current battery level of the particular client device comprises predicting the remaining battery duration of the given device based on at least (i) the predicted battery usage over time of the particular client device, (ii) the current battery level of the particular client device, and (iii) an idle-state battery usage over time of the particular client device.

12. The server device of claim 9, wherein instructing the particular client device to take the action based upon the predicted battery usage over time comprises instructing the particular client device to display the indication of the at least one application operating on the particular client device, and wherein the at least one application is associated with a disproportionate battery usage over time.

13. The server device of claim 9, wherein each respective application operating on the particular client device is associated with a respective priority, wherein instructing the particular client device to take the action based upon the predicted battery usage over time comprises instructing the particular client device to display the indication of the at least one application operating on particular the client device, and wherein the at least one application is associated with a priority that is below a given priority threshold.

14. The server device of claim 9, wherein instructing the particular client device to take the action based upon the predicted battery usage over time comprises instructing the particular client device to terminate operation of the at least one application operating on the particular client device, and wherein the at least one application is associated with a disproportionate battery usage over time.

15. The server device of claim 9, wherein each respective application operating on the particular client device is associated with a respective priority, wherein instructing the particular client device to take the action based upon the predicted battery usage over time comprises instructing the particular client device to terminate operation of the at least one application operating on the particular client device, and wherein the at least one application is associated with a priority that is below a given priority threshold.

16. The server device of claim 9, wherein the program instructions further cause the server device to instruct the particular client device to change at least one setting of the particular client device, wherein the at least one setting is associated with a disproportionate battery usage over time.

17. A method performed by a client device on which a battery manager is operating, the method comprising:
　the battery manager making a plurality of measurements of respective battery levels of the client device, wherein each of the measurements is associated with respective data comprising a respective set of one or more applications operating on the client device and respective settings of the client device;
　the battery manager transmitting a report of the plurality of measurements and associated data to a server;
　the battery manager receiving a message from the server, the message instructing the battery manager to take an action to reduce a battery usage over time by the client device; and
　in response to receiving the message, the battery manager initiating the action to the reduce battery usage over time by the client device, wherein the action comprises terminating operation of at least one application operating on the client device.

18. The method of claim 17, wherein the at least one application is associated with a disproportionate battery usage over time.

* * * * *